US012785977B2

(12) United States Patent
Mukha

(10) Patent No.: US 12,785,977 B2
(45) Date of Patent: Nov. 3, 2026

(54) INTELLIGENT ARRANGEMENT OF UNLOCK NOTIFICATIONS

(71) Applicant: ASSA ABLOY AB, Stockholm (SE)

(72) Inventor: Matvey Mukha, Graz (AT)

(73) Assignee: ASSA ABLOY AB, Stockholm (SE)

(*) Notice: Subject to any disclaimer, the term of this patent is extended or adjusted under 35 U.S.C. 154(b) by 199 days.

(21) Appl. No.: 18/259,129

(22) PCT Filed: Sep. 14, 2021

(86) PCT No.: PCT/EP2021/075225

§ 371 (c)(1),
(2) Date: Jun. 23, 2023

(87) PCT Pub. No.: WO2022/144099

PCT Pub. Date: Jul. 7, 2022

(65) Prior Publication Data

US 2024/0056306 A1 Feb. 15, 2024

Related U.S. Application Data

(60) Provisional application No. 63/132,942, filed on Dec. 31, 2020.

(51) Int. Cl.
*H04L 29/06* (2006.01)
*G06F 21/44* (2013.01)
(Continued)

(52) U.S. Cl.
CPC .......... *H04L 9/3234* (2013.01); *G06F 21/445* (2013.01); *H04W 12/03* (2021.01); *H04W 12/069* (2021.01); *G07C 9/00309* (2013.01)

(58) Field of Classification Search
CPC . H04L 9/3234; H04L 63/0823; G06F 21/445; G06F 21/31; H04W 12/03;
(Continued)

(56) References Cited

U.S. PATENT DOCUMENTS 8,774,714 B2 7/2014 Metivier
8,941,465 B2 1/2015 Pineau et al.
(Continued)

FOREIGN PATENT DOCUMENTS

CA 3107526 3/2020
CN 101088247 12/2007
(Continued)

OTHER PUBLICATIONS

"Japanese Application Serial No. 2023-540107, Voluntary Amendment Filed Sep. 13, 2024", with English claims, 16 pages.
(Continued)

*Primary Examiner* — Yogesh Paliwal
(74) *Attorney, Agent, or Firm* — Schwegman Lundberg & Woessner, P.A.

(57) ABSTRACT

A method of operating an access control system comprises detecting one or more physical access portals using an application of a mobile device; displaying notifications for the one or more physical access portals on a display screen of the mobile device; receiving a selection of a physical access portal using a user interface of the mobile device; establishing a secure communication channel with a secure relay device associated with the selected physical access portal; sending an encrypted access token stored in the mobile device to the secure relay device; and granting access by the secure relay device to the selected physical access portal according to the encrypted access token.

21 Claims, 5 Drawing Sheets

(51) Int. Cl.

| | |
|---|---|
| ***H04L 9/32*** | (2006.01) |
| ***H04W 12/03*** | (2021.01) |
| ***H04W 12/069*** | (2021.01) |
| *G07C 9/00* | (2020.01) |

(58) Field of Classification Search
CPC ... H04W 12/069; H04W 12/06; H04W 12/08; G07C 9/00309; G07C 9/00182
See application file for complete search history.

(56) References Cited

U.S. PATENT DOCUMENTS

| | | | | |
|---|---|---|---|---|
| 9,317,985 | B2 | 4/2016 | Tehranchi et al. | |
| 9,483,887 | B1 | 11/2016 | Soleimani | |
| 9,483,934 | B2 | 11/2016 | Kotlicki | |
| 9,501,883 | B2 | 11/2016 | Handville et al. | |
| 9,659,424 | B2 | 5/2017 | Huber et al. | |
| 9,852,562 | B2 | 12/2017 | Belhadia et al. | |
| 10,013,825 | B2 | 7/2018 | Belhadia et al. | |
| 10,246,905 | B2 | 4/2019 | Al-Kahwati et al. | |
| 10,305,895 | B2 | 5/2019 | Barry et al. | |
| 10,443,266 | B2 | 10/2019 | Johnson et al. | |
| 10,643,461 | B2 | 5/2020 | Davis | |
| 10,686,883 | B2 | 6/2020 | Dunsbergen et al. | |
| 10,708,410 | B2 | 7/2020 | Gerhardt et al. | |
| 10,755,503 | B2 | 8/2020 | Shin et al. | |
| 10,755,505 | B2 | 8/2020 | Fujiwara et al. | |
| 11,158,144 | B2 | 10/2021 | Friedli | |
| 11,297,458 | B1 | 4/2022 | Abramson et al. | |
| 2003/0151493 | A1 | 8/2003 | Straumann et al. | |
| 2005/0241003 | A1 | 10/2005 | Sweeney et al. | |
| 2007/0025314 | A1 | 2/2007 | Gerstenkorn | |
| 2007/0200665 | A1 | 8/2007 | Studerus | |
| 2008/0287062 | A1 | 11/2008 | Claus et al. | |
| 2012/0169461 | A1 | 7/2012 | Dubois, Jr. | |
| 2013/0189924 | A1 | 7/2013 | Pedro et al. | |
| 2013/0214902 | A1 | 8/2013 | Pineau et al. | |
| 2014/0095994 | A1* | 4/2014 | Kim | G06F 3/016 715/702 |
| 2014/0375422 | A1 | 12/2014 | Huber et al. | |
| 2015/0170448 | A1 | 6/2015 | Robfogel et al. | |
| 2015/0199859 | A1 | 7/2015 | Ouyang et al. | |
| 2016/0036788 | A1 | 2/2016 | Conrad et al. | |
| 2016/0050271 | A1 | 2/2016 | Tohzaka et al. | |
| 2016/0155281 | A1 | 6/2016 | O'toole et al. | |
| 2016/0239001 | A1 | 8/2016 | Chin et al. | |
| 2016/0260271 | A1 | 9/2016 | Belhadia et al. | |
| 2016/0321647 | A1 | 11/2016 | Mclaughlin | |
| 2016/0358397 | A1 | 12/2016 | Kristensen et al. | |
| 2017/0046107 | A1 | 2/2017 | Mihira | |
| 2017/0271915 | A1 | 9/2017 | Quinn et al. | |
| 2018/0025563 | A1 | 1/2018 | Kerning et al. | |
| 2018/0262891 | A1 | 9/2018 | Wu et al. | |
| 2018/0309741 | A1 | 10/2018 | Neafsey et al. | |
| 2018/0322759 | A1* | 11/2018 | Devdas | A61B 5/0002 |
| 2018/0341393 | A1* | 11/2018 | Frenette | H04W 48/20 |
| 2019/0096148 | A1 | 3/2019 | Hopkins et al. | |
| 2019/0122293 | A1 | 4/2019 | Minsely et al. | |
| 2019/0172285 | A1 | 6/2019 | Jin | |
| 2019/0182672 | A1* | 6/2019 | Kuenzi | H04W 12/084 |
| 2019/0236877 | A1 | 8/2019 | Scoggins et al. | |
| 2019/0327098 | A1 | 10/2019 | Hart | |
| 2019/0371101 | A1 | 12/2019 | Friedli | |
| 2020/0100108 | A1 | 3/2020 | Everson et al. | |
| 2020/0143611 | A1 | 5/2020 | Shin et al. | |
| 2020/0160633 | A1 | 5/2020 | Zhang et al. | |
| 2020/0314651 | A1 | 10/2020 | Pirch et al. | |
| 2020/0351661 | A1* | 11/2020 | Kuenzi | G06Q 30/0267 |
| 2020/0396680 | A1 | 12/2020 | Murali | |
| 2021/0019970 | A1 | 1/2021 | Strömberg et al. | |
| 2021/0056786 | A1 | 2/2021 | De La Garza et al. | |
| 2021/0136157 | A1 | 5/2021 | Kauppila et al. | |
| 2021/0302536 | A1* | 9/2021 | Casamassima | G01S 5/0278 |
| 2022/0060450 | A1 | 2/2022 | Slovetskiy | |
| 2024/0054836 | A1 | 2/2024 | Mukha | |

FOREIGN PATENT DOCUMENTS

| | | | |
|---|---|---|---|
| CN | 104620250 | | 5/2015 |
| CN | 204390327 | | 6/2015 |
| CN | 104778765 | | 7/2015 |
| CN | 106652145 | | 5/2017 |
| CN | 106846583 | | 6/2017 |
| CN | 107735817 | | 2/2018 |
| CN | 108683674 | | 10/2018 |
| CN | 109559407 | | 4/2019 |
| CN | 116762110 | | 9/2023 |
| CN | 116783633 | | 9/2023 |
| EP | 2677506 | A2 | 12/2013 |
| EP | 2677506 | A3 | 4/2015 |
| EP | 2425516 | | 9/2019 |
| EP | 3635978 | | 4/2020 |
| EP | 3748900 | | 12/2020 |
| JP | 2005157881 | A | 6/2005 |
| JP | 2017138926 | | 8/2017 |
| JP | 2019061672 | A | 4/2019 |
| JP | 2020511069 | A | 4/2020 |
| JP | 2020202505 | A | 12/2020 |
| JP | 2024501550 | | 1/2024 |
| JP | 2024501696 | | 1/2024 |
| KR | 20130142646 | | 12/2013 |
| KR | 101598793 | | 3/2016 |
| WO | 2016019064 | | 2/2016 |
| WO | 2016027405 | | 2/2016 |
| WO | WO-2020061567 | A1 | 3/2020 |
| WO | 2020074430 | | 4/2020 |
| WO | 2020197283 | | 10/2020 |
| WO | 2022144099 | | 7/2022 |
| WO | 2022144100 | | 7/2022 |

OTHER PUBLICATIONS

"Korean Applicaiton Serial No. 10-2023-7025600, Voluntary Amendment filed Sep. 12, 2024", with English claims, 11 pages.
"European Application Serial No. 21782694.0, Response to Communication Pursuant to Rules 161 and 162 EPC filed Feb. 14, 2024", 13 pages.
"International Application Serial No. PCT EP2021 075225, International Preliminary Report on Patentability mailed Jul. 13, 2023", 10 pgs.
"International Application Serial No. PCT EP2021 075234, International Preliminary Report on Patentability mailed Jul. 13, 2023", 7 pgs.
"Australian Application Serial No. 2021414980, Voluntary Amendment Filed Jul. 20, 2023", 11 pgs.
"Australian Application Serial No. 2021413662, Voluntary Amendment Filed Jul. 20, 2023", 20 pgs.
"Korean Application 10-2023-7025600, Voluntary Amendment Filed Aug. 1, 2023", with English claims, 92 pages.
"Korean Application No. 10-2023-7025983, Voluntary Amendment Filed Aug. 1, 2023", with English claims, 49 pages.
"Japanese Application Serial No. 2023-540086, Voluntary Amendment filed Sep. 27, 2023", with English claims, 15 pages.
"Japanese Application Serial No. 2023-540107, Voluntary Amendment Filed Sep. 27, 2023", with English claims, 28 pages.
"Argo and the ISEO Zero1 Access Control Devices", ISEO, (Jun. 11, 2020), 185 pgs.
"ILOQ NFC", [Online] Retreived from the Internet: URL: https: www.iloq.com nfc the-big-idea , (Retrieved on Feb. 4, 2021), 6 pgs.
"Salto JustIN Mobile", Salto Systems, [Online] Retreived from the Internet: URL: https: www.saltosystems.com en product-range explanation 1 salto-justin-mobile , (Retrieved on Feb. 4, 2021), 3 pgs.
"Yale SCLAK", Assa Abloy, [Online] Retrieved from the Internet: URL: https: www.yalelock.it en yale yale-italy smart-living yale-sclak , (Retrieved on Feb. 4, 2021), 3 pgs.
"Assa Cliq Electronic Access Control", Assa Abloy, [Online] Retrieved from the Internet on Feb. 4, 2021: URL: https: www.assalock.com en products eac c4cliq1 , (2019), 3 pgs.
"Parakey—The market's leading platform for mobile access", Parakey AB, [Online] Retrieved from the Internet: URL: https: www.parakey.co , (Retrieved on Feb. 4, 2021), 10 pgs.

(56) References Cited

OTHER PUBLICATIONS

"Universal Module V3", Danalock ApS, [Online] Retrieved from the Internet on Feb. 3, 2021: URL: https: danalock.com products universal-module-v3 , (2021), 9 pgs.
"SpiderDoor ByFlow Technology", SpiderDoor, https: www.spiderdoor.com spiderdoor1606342074526, (Retrieved on Feb. 4, 2021), 1 pg.
"Honeywell InTym: Time and Attendance", Honeywell HBT, [Online] Retrieved from the Internet on Feb. 5, 2021: URL: https: www.honeywellbuildings.in intelligent-security mass-mid-segment access-control-system software intym-time-and-attendance, (2020), 11 pgs.
"Manage Time and Attendance the Smart Way—Presenting InTym Powered by Honewell", Honeywell International Inc., (2019), 2 pgs.
"Parakey Video", Facebook, [Online] Retrieved from the Internet on Feb. 5, 2021: URL: https: www.facebook.com parakey.co videos vb.243234885877809 685004845587610?type=2andtheater, (Mar. 25, 2020), 5 pgs.
"International Application Serial No. PCT EP2021 075225, International Search Report mailed Jan. 14, 2022", 5 pgs.
"International Application Serial No. PCT EP2021 075225, Written Opinion mailed Jan. 14, 2022", 8 pgs.
"International Application Serial No. PCT EP2021 075234, International Search Report mailed Jan. 10, 2022", 4 pgs.
"International Application Serial No. PCT EP2021 075234, Written Opinion mailed Jan. 10, 2022", 5 pgs.
Alexandrou, Alex, "Physical Security: Interior Applications—Doors, Access Control", Shapiro L., Maras MH. (eds) Encyclopedia of Security and Emergency Management, Springer, Retrieved from the Internet: URL: https: doi.org 10.1007 978-3-319-69891-5_41-2, (2019), 8 pgs.
Arnosti, Christof, "Secure Physical Access with NFC-enabled Smartphones", IMVS Fokus Report, (2015), 9 pgs.
Karim, Rafid, "Smart Door Lock: A first prototype of a networked power lock controller with an NFC interface", Thesis, KTH Royal Institute of Technology, Stockholm, SE, (Dec. 1, 2013), 63 pgs.
"U.S. Appl. No. 18/259,133, Non Final Office Action mailed Jan. 27, 2025", 28 pgs.
"U.S. Appl. No. 18/259,133, Response filed Apr. 28, 2025 to Non Final Office Action mailed Jan. 27, 2025", 15 pgs.
"U.S. Appl. No. 18/259,133, Response filed Sep. 10, 2025 to Advisory Action mailed Aug. 27, 2025", 14 pgs.
"Canadian Application Serial No. 3203521, Voluntary Amendment filed Sep. 15, 2025", 8 pgs.
"Chinese Application Serial No. 202180092214.4, Office Action mailed Jul. 22, 2025", with English translation, 18 pages.
"Chinese Application Serial No. 202180092475.6, Office Action mailed Jul. 26, 2025", with English translation, 22 pages.
"Japanese Application Serial No. 2023-540107, Notification of Reasons for Refusal mailed Aug. 19, 2025", with English translation, 8 pages.
"U.S. Appl. No. 18/259,133, Non Final Office Action mailed Oct. 9, 2025", 31 pgs.
"U.S. Appl. No. 18/259,133, Response filed Jan. 8, 2026 to Non Final Office Action mailed Oct. 9, 2025", 14 pgs.
"Chinese Application Serial No. 202180092475.6, Response filed Nov. 21, 2025 to Office Action mailed Jul. 26, 2025", W/English Claims, 16 pgs.
"Japanese Application Serial No. 2023-540086, Notification of Reasons for Refusal mailed Sep. 30, 2025", w/ English Translation, 6 pgs.
"Japanese Application Serial No. 2023-540086, Response filed Dec. 8, 2025 to Notification of Reasons for Refusal mailed Sep. 30, 2025", w/ English Claims, 11 pgs.
"Japanese Application Serial No. 2023-540107, Response filed Nov. 19, 2025 to Notification of Reasons for Refusal mailed Aug. 19, 2025", W/ English Claims, 11 pgs.
"U.S. Appl. No. 18/259,133, Notice of Allowance mailed May 4, 2026", 10 pgs.
"U.S. Appl. No. 18/259,133, Response filed Apr. 23, 2026 to Final Office Action mailed Feb. 24, 2026", 11 pgs.
"Chinese Application Serial No. 202180092214.4, Response filed Apr. 24, 2026 to Office Action mailed Feb. 26, 2026", W/English Claims, 13 pgs.
"Chinese Application Serial No. 202180092214.4, Response filed Nov. 21, 2025 to Office Action mailed Jul. 22, 2025", with English claims, 25 pages.
"Chinese Application Serial No. 202180092475.6, Office Action mailed Apr. 4, 2026", with English translation, 12 pages.
"European Application Serial No. 21783150.2, Communication Pursuant to Article 94(3) EPC mailed Feb. 24, 2026", 9 pgs.
"Korean Application Serial No. 10-2023-7025600, Notice of Preliminary Rejection mailed Mar. 31, 2026", with English translation, 10 pages.
"Korean Application Serial No. 10-2023-7025983, Notice of Preliminary Rejection mailed Mar. 20, 2026", w/ English Translation, 8 pgs.
"Chinese Application Serial No. 202180092214.4, Office Action mailed Feb. 26, 2026", with English translation, 13 pages.
"European Application Serial No. 21777703.6, Communication Pursuant to Article 94(3) EPC mailed Mar. 27, 2026", 8 pgs.
"Japanese Application Serial No. 2023-540086, Notification of Reasons for Refusal mailed Mar. 3, 2026", with English translation, 14 pages.
"Japanese Application Serial No. 2023-540107, Notification of Reasons for Refusal mailed Feb. 24, 2026", with manual English translation, 4 pages.
"U.S. Appl. No. 18/259,133, Final Office Action mailed Feb. 24, 2026", 31 pgs.

* cited by examiner

INTELLIGENT ARRANGEMENT OF UNLOCK NOTIFICATIONS

PRIORITY APPLICATION(S)

This application is a national stage application under 35 U.S.C. § 371 of PCT Appl. No. PCT/EP2021/075225, titled "Intelligent Arrangement of Unlock Notifications," filed Sep. 14, 2021, which claims priority to U.S. Prov. Patent Appl. No. 63/132,942, filed Dec. 31, 2020, each of which is incorporated herein in its entirety by reference.

TECHNICAL FIELD

Embodiments illustrated and described herein generally relate to automatic identity authentication systems that authenticate users for access to secure resources, and to techniques of secure messaging for identity authentication systems.

BACKGROUND

Physical access control systems (PACs) grant physical access to an authorized user through a controlled portal. Typically, the access authorization involves intrusive actions of the user such as entering or swiping an access card at a card reader or entering a personal identification number (PIN) or password. A PAC system authenticates and authorizes a person to pass through a physical access point such as a secured door. Improvements to PAC systems are described herein having innovative interplay between wireless technologies, smart phones, secure access points, and cloud infrastructure.

DETAILED DESCRIPTION

Figure 1:
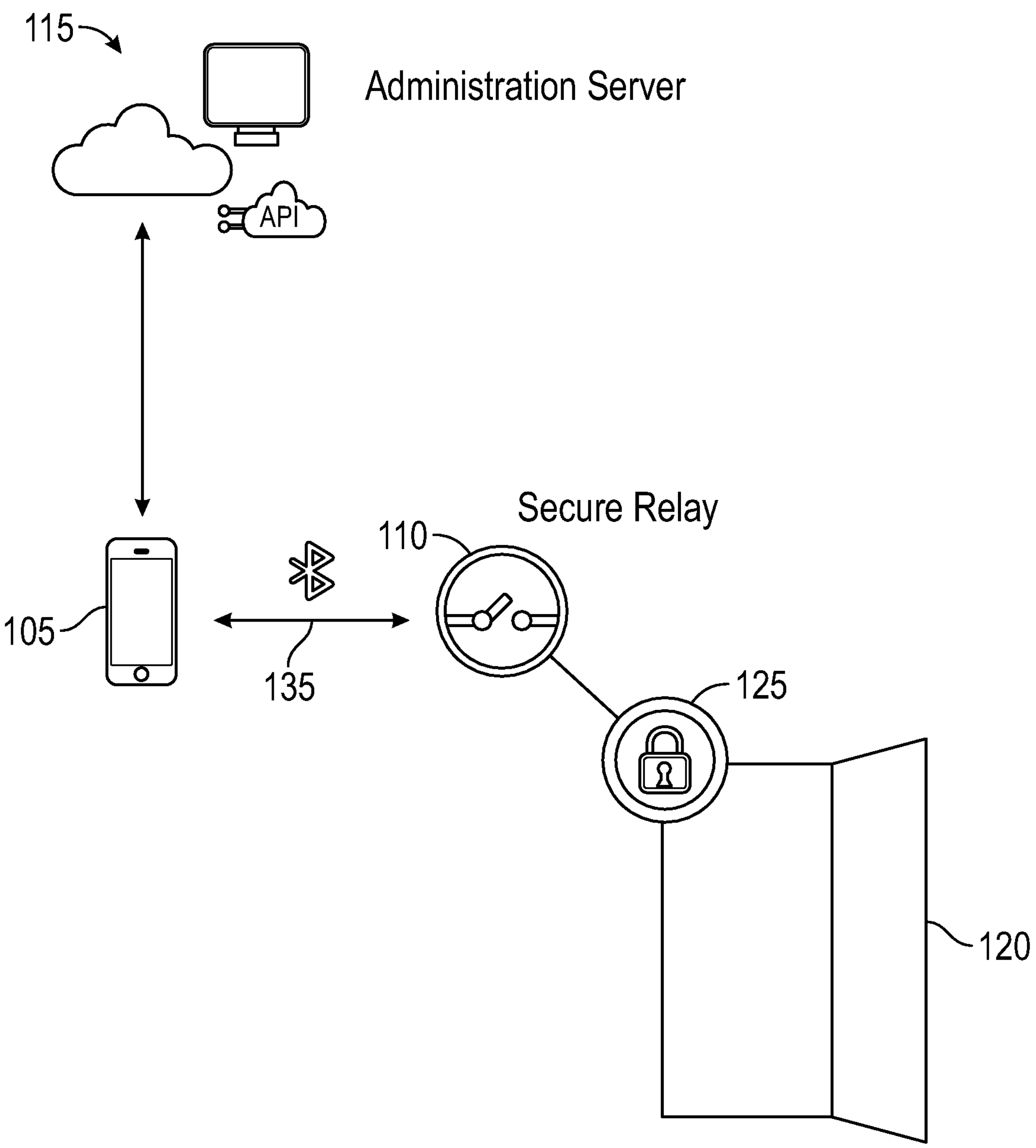
FIG. 1 is an illustration of an example of portions of a secure access control system.

FIG. 1 is an illustration of an access control system. The system includes a mobile device 105, a secure relay device 110 and an administration server 115. Some examples of the mobile device 105 are a mobile phone (e.g., a smartphone), a wearable computing device (e.g., a smartwatch), a tablet computer, or any other portable computing device. The mobile device 105 stores access credential information that controls the access of the user to the physical access portal 120 (e.g., a door). The secure relay device 110 grants the access based on the access credential information provided by the mobile device 105. While the secure relay device 110 controls the actual physical access to the physical access portal 120, it is a relatively simple device that does not require access to a system backend server or a system access control server. The secure relay device 110 only needs to receive information from the mobile device 105 using out of band (OOB) signaling 135 different from the cellular network (e.g., Bluetooth® Low Energy (BLE) signaling) and to initiate opening of the physical access portal 120. The secure relay device 110 may send a signal or other indication to an automatic lock 125 that secures the physical access portal 120, or the automatic lock 125 may be integral to the secure relay device 110.

As will be described herein in more detail, to gain access to the physical portal 120, the mobile device 105 identifies a physical portal using a beacon signal transmitted by the secure relay device 110. The mobile device 105 initiates secure communication with the secure relay device 110 and pushes an access token for the portal to the secure relay device 110. The secure relay device 110 checks the information in the access token to determine whether to grant access.

Figure 2:
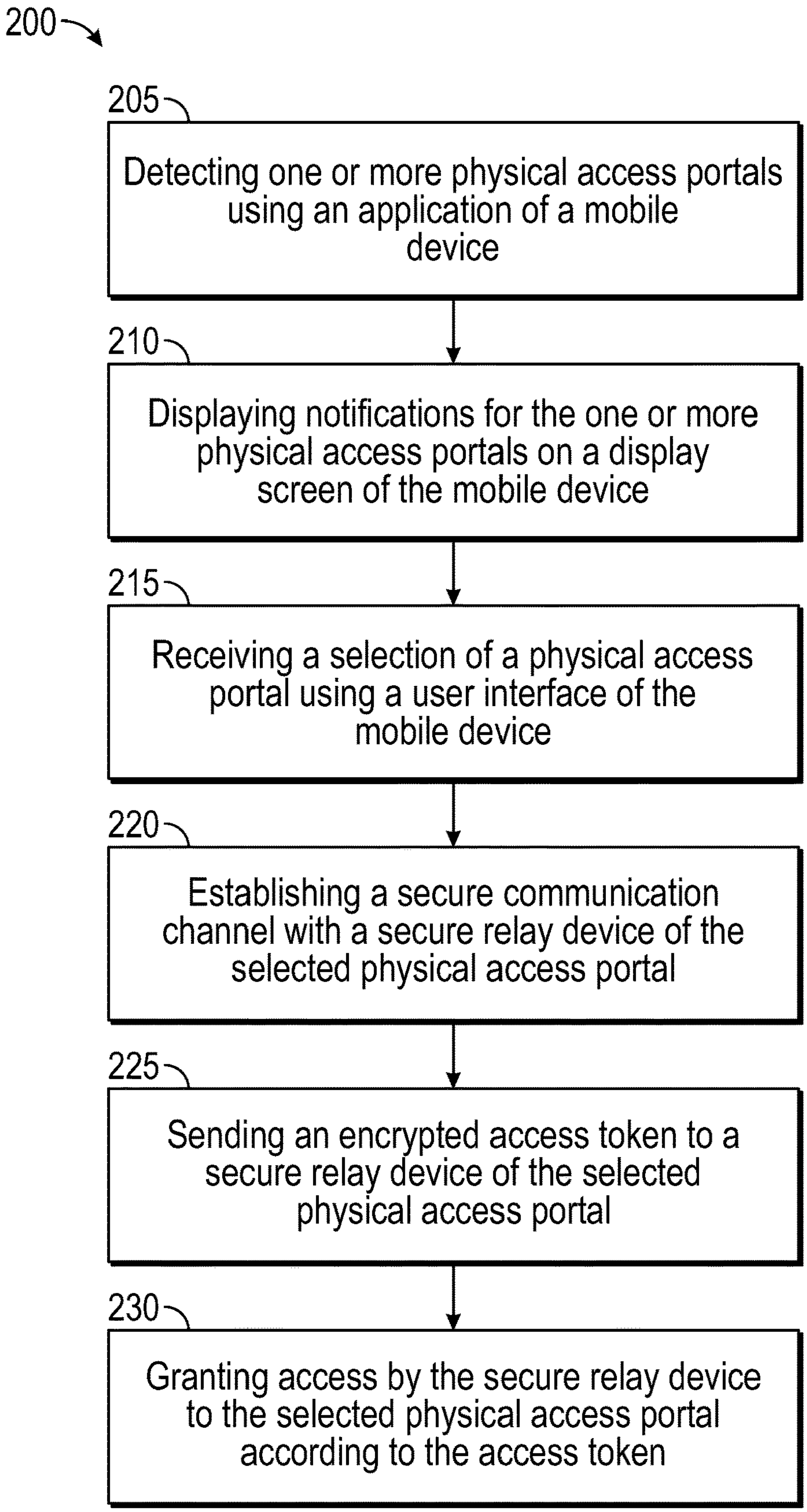
FIG. 2 is a flow diagram of an example of a method of operating an access control system.

FIG. 2 is a flow diagram of an example of a method 200 of operating an access control system, such as the access control system shown in FIG. 1 for example. At block 205, one or more physical access portals 120 are detected using a verification application of a mobile device 105. The physical access portals 120 may be detected from low energy beacon signals transmitted at the physical access portals, such as a BLE beacon signal broadcast by a secure relay device 110 or other OOB signaling. Each beacon signal can include an identification of the corresponding physical access portal 120 or secure relay device 110.

Figure 3:
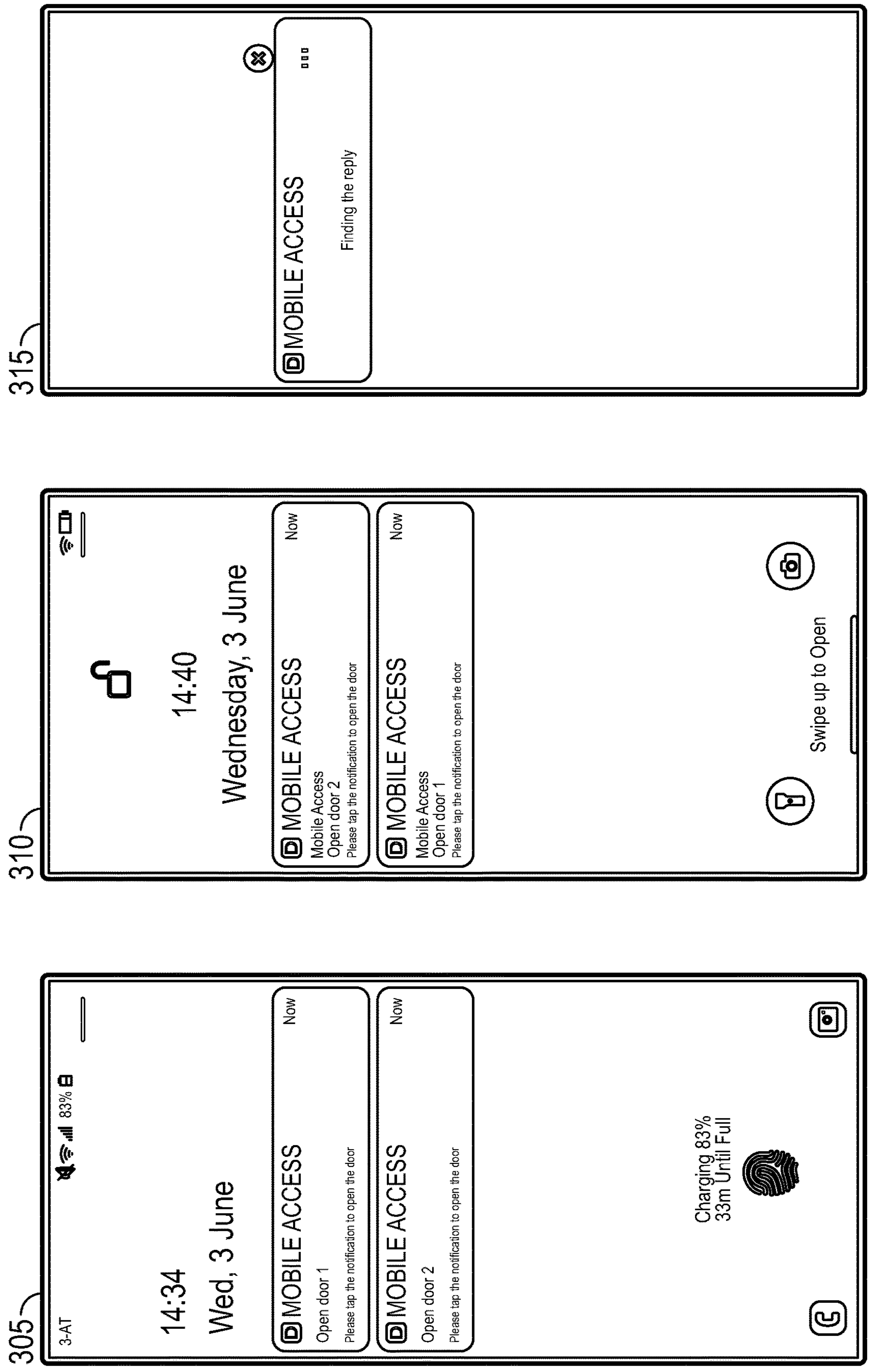
FIG. 3 shows examples of a display screen of a mobile device of a secure access control system.

At block 210, notifications for the one or more detected or identified physical access portals 120 are presented on a display screen of the mobile device 105, and at block 215 a selection of a physical access portal is received by the mobile device 105 via a user interface (e.g., a touch-sensitive display screen). FIG. 3 shows examples of displayed notifications of physical access portals (e.g., doors). In display screen 305, the notifications are displayed while the mobile device 105 is locked from use. The user unlocks the device and enters a selection. In some examples, a selection of a physical access portal can be accepted by the mobile device 105 while the mobile device 105 is locked. In display screen 310, the notifications are displayed after the user unlocks the mobile device 105 for use.

Returning to FIG. 2, the process of verification of the credentials of the user and the authentication of the devices then proceeds. At block 220, a mutually authenticated secure channel is established between the mobile device 105 and the secure relay device 110 before sending access credential information to the secure relay device. Device authentication information is sent from the mobile device 105 to the secure relay device 110. The authentication information can include a certificate and a mobile device identifier (Mobile Device ID). The mobile device 105 may also authenticate the secure relay device. The secure relay device 110 may send authentication information (e.g., a certificate and a Relay ID) to the mobile device 105, which the mobile device 105 uses to authenticate the secure relay device 110.

At block 225, when the device authentication is completed, the mobile device 105 sends encrypted or otherwise cryptographically protected access credential information to the secure relay device 110. Encryption in the access control system may be based on public key infrastructure (PKI) and may use public key cryptography. At block 230, the secure relay device 110 decrypts the access credential information, checks validity of the access credential information, and grants access to the physical access portal based on the access credential information. The secure relay device 110 may send a signal or other indication to an automatic lock 125 that secures the physical access portal 120. The mobile device 105 may display the opening status of the physical access portal 120.

The functional blocks in FIG. 2 need not be performed in the order shown. For example, the mobile device 105 may authenticate and establish a secure communication channel with the detected physical access portals (block 220) before the user enters a selection of a physical access portal (block 215). The secure communications with the secure relay device 110 of non-selected physical access portals is then stopped.

As explained previously herein, notifications of physical access portals detected by the mobile device are presented on the display screen of the mobile device. When the user turns the mobile device display screen on, the user is presented with a set of notifications on the lock screen (e.g., the lock screen 305 of FIG. 3). A user touches the displayed notification corresponding to the desired portal. In some examples, the operating system (OS) then presents an authentication screen (e.g., to provide a biometric or to enter a personal identification number (PIN) code). The verification application launches after the user authenticates.

The verification application may use beacon ranging (e.g., iBeacon) to detect portals in the vicinity. The beacon ranging may be linked to the "screen on" and "screen off" of the mobile device. A "screen on" event may turn on beacon ranging for a predetermined period of time (e.g., 10 seconds). Beacon ranging may be terminated when the screen turns off. This beacon ranging can result in all the portals within the signaling range appearing as notifications on the screen. The notifications may be presented for a limited time duration (e.g., ten seconds). Each notification displays the secure relay device ID of the portal. One issue that can develop with the displaying of the notifications is there may be many physical portals (e.g., doors) located close to each other in the vicinity of the mobile device. In this case, the user may be presented with an overwhelming number of notifications for the portals.

In one approach to address the issue, the application may maintain a list of physical portals that are shown as notifications. The list can be maintained by either by the system administrator or by the user. The application determines those physical access portals of the detected portals that the user can access (e.g., a "white list") and only presents the white list portals on the display screen. The white list may be created and maintained by the system administrator or by the user. For example, in a situation where the user enters a warehouse with a lot of storage lockers, the user is presented only with a white list of notifications that correspond to the storage lockers the user is allowed to open. Storage lockers not on the white list are not presented to the user. Alternatively, a "black list" is maintained for portals that the user is not allowed to open and these black list portals are not included in the notifications. In certain examples, the user may define the white list or black list using a user interface for the verification application. In certain examples, the white list or black list is provided by the administration server as a policy.

In another approach, the verification application determines the distance of the identified physical access portals 120 from the mobile device 105 (and therefore from the user) and sorts and presents the notifications for the detected physical access portals in an order determined by proximity to the user (e.g., the closest first). The distance can be determined using the received beacon signal strength (e.g., Bluetooth® Low Energy Relative Signal Strength Indicator (BLE RSSI)), or other radio signal (e.g., ultra-wide band (UWB) radio signals) indicating distance, position, or movement of the user towards a reference point related to the physical access portal. In some examples, the recent history of signal strength reading (e.g., recent BLE RSSI patterns) are used to determine an order to present the notifications. When the physical access portals are detected, those portals recently visited based on the beacon signal are presented first among the notifications presented on the display screen.

UWB is a radio communication methodology that uses a wide signal bandwidth. The wide bandwidth is typically defined as either a −10 decibel (−10 dB) bandwidth greater than 20% of the center frequency of the signal, or a bandwidth greater than 500 megahertz (500 MHz) in absolute terms. Commercial UWB systems are intended to be used in complex environments such as residential, office, or industrial indoor areas. In these environments, signal reflection and diffraction play a significant role. The signal received by an antenna is the sum of the attenuated, delayed and possibly overlapping versions of the transmitted signal and may vary over time (due to movement of receiver/transmitter or change in environment). These different versions of the transmitted signal are typically referred to as multipath components. The large bandwidth of UWB systems provides a high level of resilience to frequency selective fading, which is an effect that can limit the performance of narrow-band technologies. Presence of UWB signaling transmitted by a UWB capable secure relay device 110 detected by a UWB capable mobile device 105 can be used to detect presence of the user near a physical access portal 120.

The accurate ranging capability of UWB signaling allows intent of the user (e.g., movement toward a physical access portal) to be determined. This localization-based intent of the user can be deduced by the change in distance between a UWB capable mobile device 105 and a UWB capable secure relay device 110, and by the change in angle between the mobile device 105 and the secure relay device 110. In some examples, the mobile device 105 may perform ranging using Time-of-Flight (TOF) Two Way Ranging (TWR). In TWR, radio packets are exchanged between the mobile device 105 and the secure relay device 110. The timing differences for the transmitting and receiving of the packets between the mobile device 105 and the secure relay device 110 can be used to calculate ranging information such as change in one or both of distance and angle to determine intent of the user to gain access to the physical access portal 120. In some examples, the presence of the user at a physical access portal 120 is detected by the mobile device first detecting a BLE beacon transmitted by the secure relay device 110. After detection, the mobile device 105 engages the secure relay device 110 using UWB signaling and the secure relay device 110 switches to UWB signaling and the intent of the user is determined using the UWB signaling. This changing over from BLE to UWB may be useful if it is not desired to constantly transmit a UWB beacon signal which may use more power than BLE signaling.

The detected physical access portals 120 can be sorted and displayed according to one or more of distance of the mobile device from the physical access portal, position of the mobile device relative to the physical access portal, and movement of the mobile device relative to the physical access portal. In certain examples, notifications of all the detected physical access portals are displayed and then some notifications are culled as the intent of the user is determined. Examples of approaches of localization-based intent can be found in co-pending U.S. patent application Ser. No. 16/828,001, and in co-pending Paris Cooperation Treat (PCT) Applications PCT/EP2020/058197, PCT/EP2020/

076428, PCT/EP2020/058199, and PCT/EP2020058216, each of which is incorporated herein by reference in its entirety.

In another example, one or more sensors (e.g., accelerometer, gyroscope) included with the mobile device 105 are used to determine one or more of distance of the mobile device 105 from the physical access portal 120, position of the mobile device 105 relative to the physical access portal 120, and movement of the mobile device 105 relative to the physical access portal 120, and the notifications are sorted and presented on the display screen according to the determined one or more of distance, position, and movement of the mobile device 105 and user. An administrator or user may set policy for the notifications so that notifications of different portals are displayed based on different detected distances of the user from the portal.

In another example, the user defines a list of preferred physical access portals 120 that are listed first among the notifications presented on the display screen. The user preferred list may be defined using a user interface for the verification application. In a further example, the verification application tracks the user history of accessing portals (e.g., by one or both of location and time of day) and orders the most visited portals first among the notifications presented.

In any of these several examples, the notifications can be presented without sound or vibration, and with the highest priority appearing first in the displayed notifications. For the mobile devices, different Android models may incorporate different launchers, different themes, and other user interface (UI) tweaks. In some examples, the lock screen may not be presented at all. The verification application for the Android devices may use a "foreground service" to track the nearby access portals.

Returning to FIG. 1, the access credential information stored by the mobile device 105 can be one or more access tokens that show authorization for access to the physical portal 120. Access tokens are presented by the mobile device 105 to the secure relay device 110 to grant access to the portal when authorization of the user is verified by the mobile device 105. The access token proves that the mobile device has access rights. An access token can include one or more of an Access Token ID, a Mobile Device ID, a Relay ID, any additional access control information, a start time for the access, an expiration time for the access, and a cryptographic signature. The Access Token ID is a unique identifier of the token. The Mobile Device ID and Relay ID establish that this mobile device 105 can open the physical portal 120 secured by the secure relay device 110. The additional access control information can include additional access control rules (e.g., time of day that access is allowed). The start time and expiration time determine the validity period for which the Access Token is valid (e.g., one week). The cryptographic signature is taken over all the fields of the access token and is generated using the private key for the access tokens.

The access tokens are generated by an administration server 115 and are periodically pushed to mobile devices 105 having the corresponding Mobile Device ID. The administration server 115 also maintains an access revocation list for every secure relay device 110. Each list contains the Access Token IDs that are currently invalid for the secure relay device 110. When a new revocation list is available, the administration server pushes the new revocation list to all the mobiles devices 105 that currently have access to the secure relay device 110.

To verify access of the mobile device holder to a particular secure relay device 110, the secure relay device 110 may check the signature, Mobile Device ID, start and expiration times, and the additional access information of the access token to determine if the physical portal 120 should be opened. The secure relay device 110 may check its own stored access revocation list for the access token and may deny access if the access token is included in the list.

The mobile device 105 may be online to perform the verification and authentication functions described but does not have to be online and may perform the functions offline. The mobile device 105 may occasionally connect to a network (e.g., the Internet or a cellular phone network) to receive updated access credential information pushed from an administration server 115. Additionally, the verification application may periodically initiate the transmitting of a request for status (e.g., an Online Certificate Status Protocol (OCSP) request) to the administration server 115 or other verification device for the access credential information of the user and receives and stores a response (e.g., an OCSP response) to the request. As part of the authentication process, the mobile device 105 may push the response to the secure relay device 110 as part of the access credential information. The secure relay device 110 checks the response and closes the connection if the response is not valid.

When a mobile device 105 is introduced to the access control system, it is personalized by the verification application and the administration server 115. The mobile device 105 establishes a secure connection with the administration server 115 and authenticates the user, such as by providing a password, invitation code, and the like. The verification application generates a key pair that is sent to the administration server 115. The administration server 115 issues a certificate for the public key of the key pair and issues a Mobile Device ID with the certificate as the root. This personalization information is then sent to the mobile device 105. The personalization information includes CA certificates for the mobile device 105 and secure relay device 110. The mobile device also receives the latest access tokens and revocation lists and stores them in long term memory. The status request (e.g., OCSP request) may be sent as part of the personalization.

The personalization information such as cryptographic key material may be stored in a secure element (SE) or secure enclave of the mobile device 105. The SE may include a secure processor or coprocessor that includes a key manager. Communication between the SE and the application processor is tightly controlled, such as by isolating the communication to an interrupt driven mailbox for example. In certain examples the information is included in a trusted execution environment (TEE) of the mobile device 105. The information may be periodically updated by being pushed to the mobile device 105 by the administration server 115. The information stored in the SE may also include the current response to the request sent to the administration server 115, and a certificate from the certificate authority (CA certificate).

The access control provided with the mobile device 105 normally operates within the boundaries of an application running on the mobile device 105. The access granting technique of FIG. 2 can be streamlined by having the access control logic included with the notification itself. Mobile devices running iOS may have program code included in the notification itself that can be run without opening the application. This program code can be activated like the "widget" feature of iOS mobile devices.

Instead of clicking the notification on the display screen the user "long-presses" the notification on the display screen while the mobile device 105 is locked. Display screen 315 of FIG. 3 shows an example with this type of notification. The mobile device 105 detects contact to the notification or icon displayed on the locked display screen corresponding to a physical access portal and detects that the contact to the icon is held for longer than a specified duration of time (i.e., a long-press). The program code included with the notification is launched in response to the long-press and the verification and authentication process begin immediately. The notification presents a small user interface where the status of the access can be tracked. This technique is more streamlined because the mobile device 105 does not have to be unlocked and the main application of the mobile device 105 does not have to be opened. The "long-press" method works well in cases where the authentication with biometrics or PIN-code is not required to open the physical portal. In some examples, the notifications of the portals are presented on the display screen after the mobile device 105 is unlocked. In certain examples, the operating system presents an authentication screen when the notification is long-pressed, and in certain examples the authentication takes place without presenting an authentication screen. Multiple long-press notifications may be displayed for multiple detected secure relay devices 110 or physical access portals 120.

Figure 4:
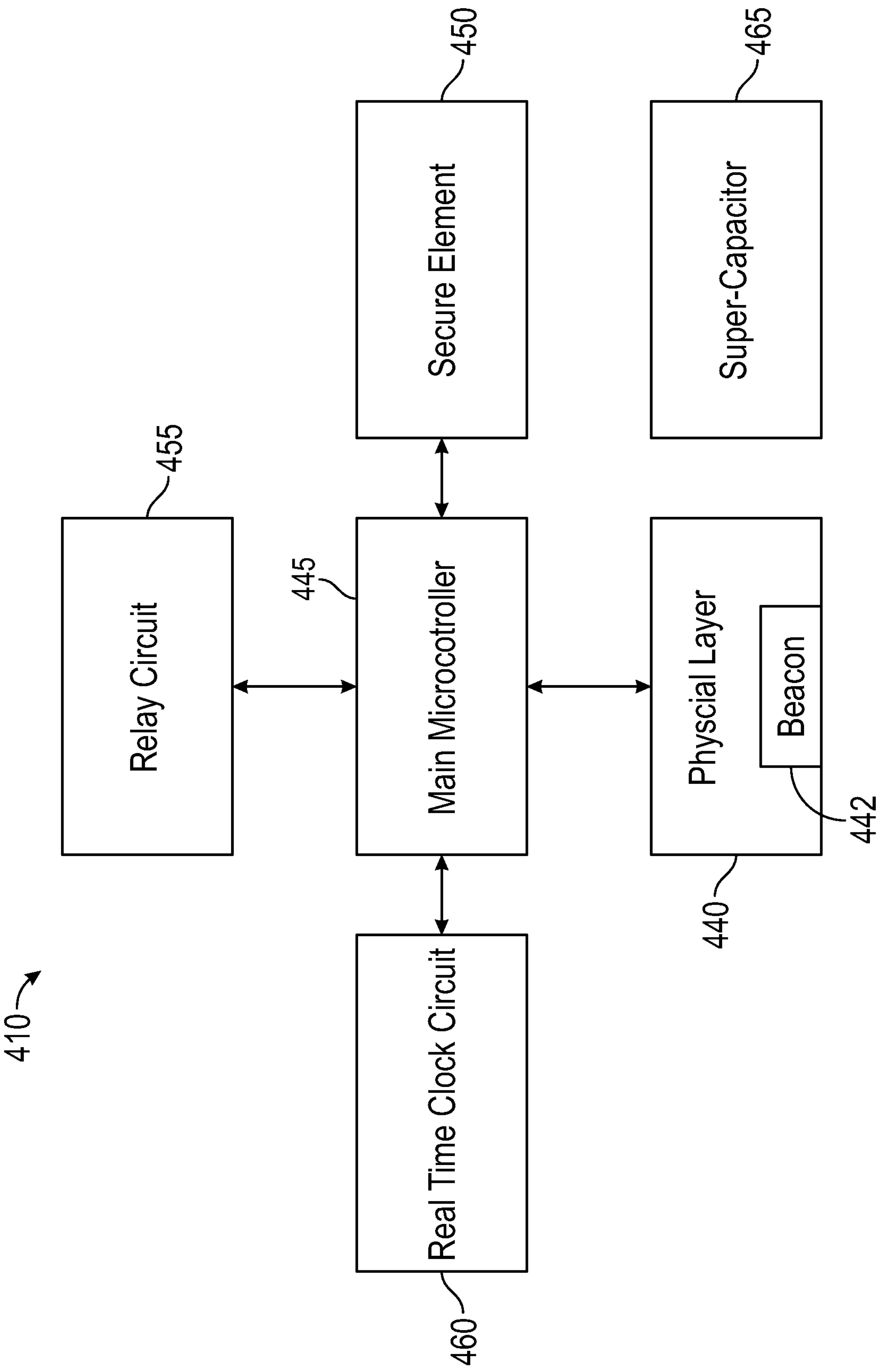
FIG. 4 is a block diagram illustrating an example of portions of a secure relay device.

FIG. 4 is a block diagram of an example of a secure relay device 410 of an access control system, such as the access control system of FIG. 1 for example. The device includes physical layer circuitry 440 and processing circuitry. The processing circuitry can include a microprocessor or microcontroller 445 and may include separate processing circuitry 442 for sending the beacon signal. The secure relay device can include memory separate from or integral to the microcontroller 445 that contains executable instructions to perform any of the functions or operations of a secure relay device described herein, such as described for the method of FIG. 2 for example. The processing circuitry is responsible for OOB signaling (e.g., BLE communication), personalization of the secure relay device 410, processing command received from the mobile device 105, storing the revocation list and personalization parameters, and implementing functions of transport layer security (TLS).

The physical layer circuitry 440 transmits and receives information wirelessly. The physical layer circuitry 440 may broadcast a beacon signal readable by a mobile device 105 to identify the secure relay device 410, or the physical layer circuitry 440 may include separate circuitry (beacon module 442) for providing beacon functionality. The beacon signal may be a BLE signal and the secure relay device acts as a BLE central device for communication with the mobile device 105 as the peripheral device. The beacon module 442 may act as an iBeacon device. The beacon module 442 may include a separate processor used for the beacon functionality. The beacon module 442 may be connected to the main microcontroller 445 using the inter-integrated circuit (I2C) protocol. Upon startup, the main microcontroller 445 sends the Relay ID that the beacon should advertise to the beacon module 442. The beacon module 442 may store the Relay ID in major and minor version fields of the advertising data and begins advertising the Relay ID using the 00B signaling.

As explained previously herein, the secure relay device 410 authenticates the mobile device 105 and provides authentication information to the mobile device 105. The processing circuitry may implement transport layer security or TLS (e.g., TLS 1.2). As explained herein, key material may be stored in a secure element of the secure relay device. If the out of band signaling is BLE, initially all the incoming BLE data is forwarded using the TLS handshaking procedure and the responses are sent back using BLE. During the TLS handshake, the Mobile ID is extracted (e.g., from the serial number of the peer certificate) and is used throughout the session. Once the handshake is complete, all BLE traffic is first TLS unwrapped. Once a full TLS frame is received, the command stored in the frame is processed by the processing circuitry, the response to the command is wrapped and sent to the mobile device. For a BLE disconnect or a general failure, the TLS handshake is rest and the handshake should be completed again. The processing circuitry of the secure relay device 410 decodes authentication information received from the mobile device 105 and encodes its authentication information for sending to the mobile device 105. When the devices authenticate, the secure relay device 410 receives encrypted access information from the mobile device 105 and the processing circuitry decrypts the access information to grant or deny access to the user. A relay circuit 455 is enabled when the access is granted, and the relay circuit may cause an automatic lock to unlock the physical access portal 120.

The secure relay device 410 may open the physical access portal 120 in response to an "Open" command received from the mobile device 105 with a valid access token. In response to the Open command, the secure relay device 410 may perform the sequence that follows. The secure relay device 410 checks that a successful "Push OCSP data" command was performed within the current TLS session, parses the access token supplied in the Open command, checks the signature of the access token and validity of the access token, verifies that the access token is not included in the revocation list, and opens the physical portal if the access token is valid and not on the revocation list. The "Push OCSP data" is a response to a valid OCSP response received from the mobile device 105 and includes the sequence that follows. The secure relay device 410 parses the OCSP response, checks the OCSP response signature and validity of the OCSP response, and returns revocation list information to the mobile device 105 if the OCSP response is valid.

The secure relay device 410 may receive a revocation list when the verification application of the mobile device performs a "Push revocation list" command. The secure relay device 410 checks whether a "Push OCSP data" command was performed within the current TLS session. If the command was performed, the secure relay device 410 parses the revocation list and checks the revocation list signature and validity. If the revocation list currently stored by the secure relay device 410 is an earlier version, the secure relay device 410 stores the later pushed version of the revocation list.

The secure relay device 410 can include a secure element 450 to store one or more cryptographic keys used for operation of the secure relay device. The secure element 450 may store one or more of a Relay private key, Relay certificate, Relay ID, a mobile device CA certificate, and a mobile device certificate response public key. The access information may include an access token, and the secure element 450 may store an access token private key for access token decryption. The secure relay device 410 may also store an access revocation list. As explained previously herein, the secure element may include a secure processor or coprocessor that includes a key manager. In some examples, the secure element performs the cryptographic operations. The secure element may communicate with the main microcontroller 445 using I2C.

Returning to FIG. 1, the administration server 115 can be implemented as a set of command-line scripts (e.g., python scripts) and may include a graphical user interface (GUI). The set of command-line scripts can include server initialization scripts, access token generation scripts, revocation list generation scripts, secure relay device personalization scripts, NFC tag personalization scripts, and mobile device provisioning scripts.

Server initialization generates keys, certificates and the file system structure, and can include the sequence that follows. A CA key pair and certificate are generated for a mobile device 105, a CA key pair and certificate are generated for a secure relay device 110, a tag CA key pair and certificate are generated, an access token signing key pair is generated, and a revocation list signing key pair is generated. These key pairs and certificates are generated for each physical access portal 120. Additionally, OCSP responses are signed by the mobile device CA key pair.

Generating access tokens by the administration server 115 can include providing Mobile Device ID, Relay ID, start time, and end time to the access token generation script. The script composes an access token using the provided information, signs the access token using an access token signing private key, and writes the new access token to a server database. The script maintains the current access token ID in the database and may increment the access token ID for each generated access token.

Generating revocation lists by the administration server 115 can include providing Relay IDs and Access Token IDs to the revocation list generation script. The script composes a revocation list with this information, signs the revocation list using a revocation list public key, and writes the new revocation list to the server database. The revocation list generation script maintains a revocation list for every secure relay device 110 and may increment the revocation list version every time it generates a new revocation list for the secure relay device 110.

The secure relay device personalization script takes a Relay ID as input and performs the sequence that follows. The current time and the Relay ID are sent to the secure relay device. Mobile device certificates, an access token public key, an OCSP key, and a revocation public key are sent to the secure relay device. The script triggers key pair generation on the secure relay device. The administration server 115 receives the public key of the key pair, sends a CA certificate to the secure relay device, and stores the certificate in the server database. The secure relay devices 110 may be personalized using an NFC interface of the secure relay device 110.

The NFC tag personalization script takes the NFC tag ID as input and performs the sequence that follows. The script sends a tag ID to the NFC tag and triggers key par generation. The administration server 115 receives the public key of the key pair, sends a CA certificate to the NFC tag, and stores the certificate in the server database.

Conventional physical access control systems include a credential device that holds the users access credentials, a reader device to check the credential and a controller device to grant physical access. The credential device stores an access credential that is presented to the reader device that receives and authenticates the access credential. If the reader device grants access, the reader device may send notification (e.g., a signal or message) to an access controller to open the physical access portal. The reader device and the access controller can be incorporated into one device. The reader device and access controller may communicate with a backend system of the access control system (e.g., a backend server). The access credential is authenticated by an authentication engine of the backed system. The present systems, devices, and methods described herein provide a secure access control system in which the roles of the reader device, the access controller device, and the backend server are performed by a mobile device 105 and a secure relay device 110. A secure validated connection is established between the secure relay device 1101 and the mobile device 105, and the access credential is securely transferred between the mobile device 105 and the secure relay device 110 using any of the methods described herein. This transfer can occur while the secure relay device 110 and the mobile device 105 are offline from the access control system backend. The mobile device 105 provides updated information (e.g., a revocation list) to the secure relay device 110 again while the devices are offline form the backend system. Thus, each of the mobile device 105 and the secure relay device 110 play part of the role of the backend system of a conventional access control system. This reduces the complexity of verification and granting access to a physical portal and thereby reduces the complexity of the device or devices needed per physical access portal (e.g., per door).

Figure 5:
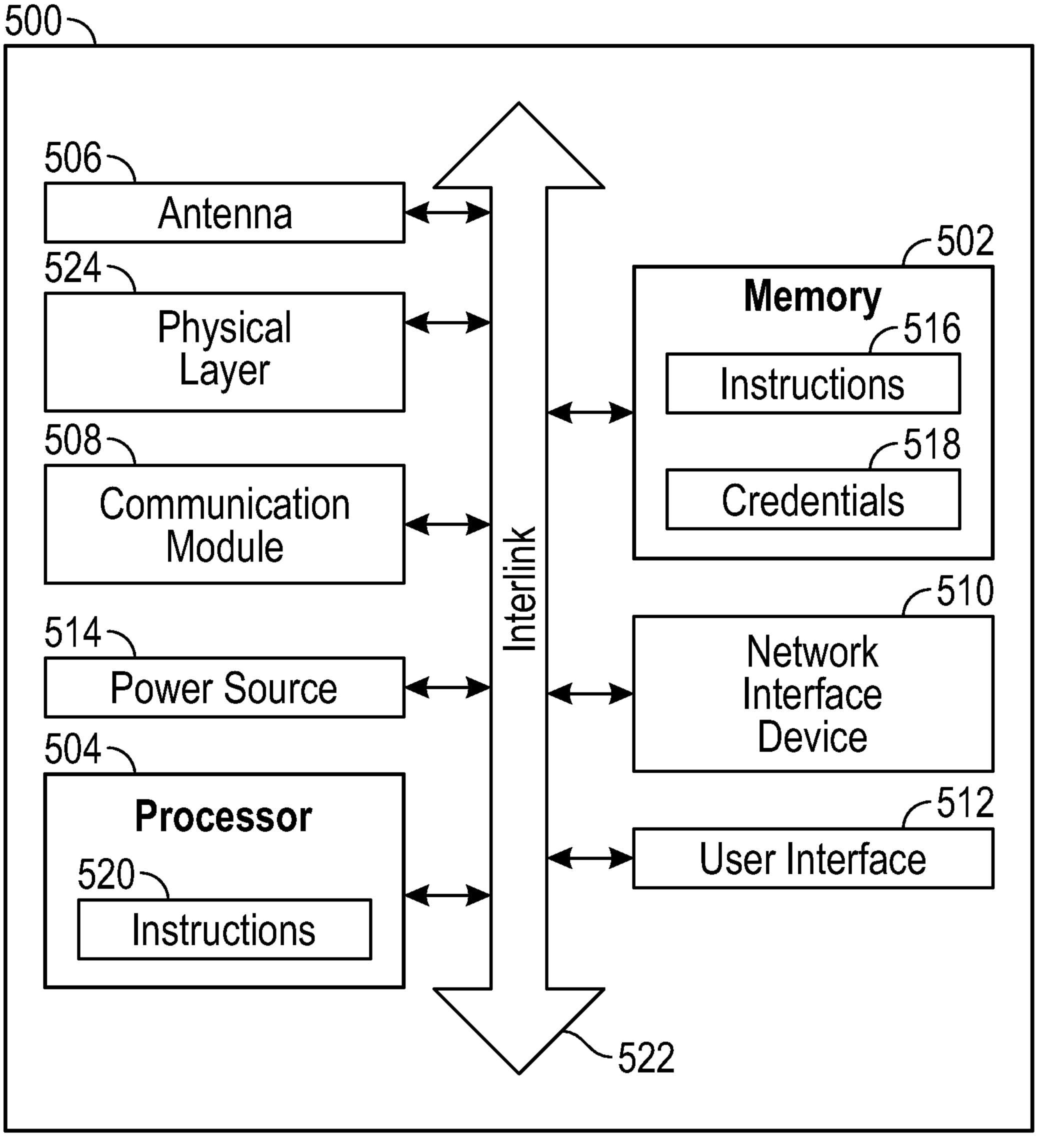
FIG. 5 is a block diagram schematic of portions of an example of a mobile device.

FIG. 5 is a block diagram schematic of various example components of a device 500 for supporting the device architectures described and illustrated herein. The device 500 of FIG. 5 could be, for example, a mobile device (e.g., the mobile device 105 of FIG. 1) that authenticates credential information of authority, status, rights, and/or entitlement to privileges for the holder of the device. The device 500 both holds the user access credentials and executes a verification application that authenticates the access credentials.

With reference specifically to FIG. 5, additional examples of a device 500 for supporting the device architecture described and illustrated herein may generally include one or more of a memory 502, processing circuitry such as processor 504, one or more antennas 506, a communication port or communication module 508, a network interface device 510, a user interface 512, and a power source 514 or power supply.

Memory 502 can be used in connection with the execution of application programming or instructions by processing circuitry, and for the temporary or long-term storage of program instructions or instruction sets 516 and/or authorization data 518, such as credential data, credential authorization data, or access control data or instructions, as well as any data, data structures, and/or computer-executable instructions needed or desired to support the above-described device architecture. For example, memory 502 can contain executable instructions 516 that are used by a processor 504 of the processing circuitry to run other components of device 500, to calculate encryption keys to communicate credential or authorization data 518, and/or to perform any of the functions or operations described herein, such as the functions and operations of a mobile device described regarding the method of FIG. 2 for example. Memory 502 can comprise a computer readable medium that can be any medium that can carry, contain, store, communicate, or transport data, program code, or instructions for use by or in connection with device 500, such as instructions for a verification application for example. Memory can include memory contained in a secure element of the mobile device. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processing circuitry of the device 500 is configured (e.g., by firmware) to perform the functions of mobile devices described herein. Such as the functions of the example method of FIG. 2. The processing circuitry can correspond to one or more computer processing devices or resources. For instance, processor 504 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 504 can be provided as a microprocessor, Central Processing Unit (CPU), or plurality of microprocessors or CPUs that are configured to execute instructions sets stored in an internal memory 520 and/or memory 502. Processing circuitry can include a processor in a secure element of the mobile device.

Antenna 506 can correspond to one or multiple antennas and can be configured to provide for wireless communications between device 500 and another device. Antenna(s) 506 can be operatively coupled to physical layer circuitry comprising one or more physical (PHY) layers 524 to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. In an example, antenna 506 may include one or more antennas coupled to one or more physical layers 524 to operate using ultra-wide band (UWB) for in band activity/communication and Bluetooth (e.g., BLE) for out-of-band (00B) activity/communication. However, any RFID or personal area network (PAN) technologies, such as the IEEE 502.15.1, near field communications (NFC), ZigBee, GSM, CDMA, Wi-Fi, etc., may alternatively or additionally be used for the 00B activity/communication described herein.

Device 500 may additionally include a communication module 508 and/or network interface device 510. Communication module 508 can be configured to communicate according to any suitable communications protocol with one or more different systems or devices either remote or local to device 500. Network interface device 510 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 510 can include an Ethernet port or other physical jack, a Wi-Fi card, a Network Interface Card (NIC), a cellular interface (e.g., antenna, filters, and associated circuitry), or the like. In some examples, network interface device 510 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 506, communication module 508, and/or network interface device 510 or subcomponents thereof, may be integrated as a single module or device, function or operate as if they were a single module or device, or may comprise of elements that are shared between them.

User interface 512 can include one or more input devices and/or display devices. Examples of suitable user input devices that can be included in user interface 512 include, without limitation, one or more buttons, a keyboard, a mouse, a touch-sensitive surface, a stylus, a camera, a microphone, etc. Examples of suitable user output devices that can be included in user interface 512 include, without limitation, one or more LEDs, an LCD panel, a display screen, a touchscreen, one or more lights, a speaker, etc. It should be appreciated that user interface 512 can also include a combined user input and user output device, such as a touch-sensitive display or the like.

Power source 514 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 500. Device 500 can also include one or more interlinks or buses 522 operable to transmit communications between the various hardware components of the device. A system bus 522 can be any of several types of commercially available bus structures or bus architectures.

ADDITIONAL DISCLOSURE AND EXAMPLES

Example 1 includes subject matter (such as a method of operating an access control system) comprising detecting one or more physical access portals using an application of a mobile device, receiving a selection of a physical access portal using a user interface of the mobile device, establishing a secure communication channel with a secure relay device associated with the selected physical access portal, sending an encrypted access token stored in the mobile device to the secure relay device, and granting access by the secure relay device to the selected physical access portal according to the encrypted access token.

In Example 2, the subject matter of Example 1 optionally includes displaying the notifications on the display screen after the user unlocks the mobile device for use.

In Example 3, the subject matter of Example 1 optionally includes displaying the notifications on the display screen while the mobile device is locked from use, and accepting the selection of the physical access portal while the mobile device is locked from use.

In Example 4, the subject matter of Example 3 optionally includes detecting contact to an icon displayed on the locked display screen corresponding to a physical access portal, and detecting holding of the contact to the icon for longer than a specified duration of time.

In Example 5, the subject matter of one or any combination of Examples 1-4 optionally includes determining which of the one or more detected physical access portals the user can access based on the access credential information, and only displaying notifications for the one or more detected physical access portals that the user can access to according to access credential information.

In Example 6, the subject matter of Example 5 optionally includes comparing identifiers of the one or more detected physical access portals to a stored list of physical access portals allowed for access by a user of the mobile device, and displaying the notifications for the one or more detected physical access portals included in the list.

In Example 7, the subject matter of Example 6 optionally includes storing the list of physical access portals allowed for access by the user, wherein the list is user-defined.

In Example 8, the subject matter of Example 6 optionally includes storing the list of physical access portals allowed for access by the user, wherein the list is administrator-defined.

In Example 9, the subject matter of one or any combination of Examples 1-8 optionally includes determining, by the application, a distance of multiple detected physical access portals to the user; and sorting and displaying the notifications for the multiple detected physical access portals in an order determined by proximity to the user.

In Example 10, the subject matter of Example 9 optionally includes determining the distance using received beacon signal strength.

In Example 11, the subject matter of Example 10 optionally includes determining the distance using a Bluetooth Low Energy Relative Signal Strength Indicator (BLE RSSI).

In Example 12, the subject matter of one or any combination of Examples 1-11 optionally includes determining, by the application, one or more of distance, position and movement of the mobile device relative to multiple detected physical access portals; and sorting and displaying the notifications for the multiple detected physical access portals according to the one or more of the determined distance, position and movement of the mobile device.

In Example 13, the subject matter of Example 12 optionally includes determining the one or more of distance, position and movement of the mobile device relative to multiple detected physical access portals using ultra-wide band (UWB) signaling.

In Example 14, the subject matter of Example 12 optionally includes determining the one or more of distance, position and movement of the mobile device relative to multiple detected physical access portals using one or more sensors included in the mobile device.

In Example 15, the subject matter of one or any combination of Examples 1-14 optionally includes comparing the one or more detected physical access portals to a list of non-allowed physical access portals stored in memory of the mobile device, and not displaying notifications for the detected physical access portals included in the list.

In Example 16, the subject matter of one or any combination of Examples 1-14 optionally includes comparing the one or more detected physical access portals to a user-defined list of non-allowed physical access portals stored in memory of the mobile device and to an administrator-defined list of non-allowed physical access portals, and not displaying notifications for the detected physical access portals included in the user-defined list and the administrator-defined list.

In Example 17, the subject matter of one or any combination of Examples 1-16 optionally includes detecting a beacon from a secure relay device of at least one physical access portal of the one or more physical access portals using the application of a mobile device.

In Example 18, the subject matter of Example 17 optionally includes detecting a Bluetooth Low Energy beacon signal or an ultra-wide band beacon signal transmitted by the secure relay device.

In Example 19, the subject matter of one or any combination of Examples 1-18 optionally includes the secure relay device comparing the access token to a revocation list of invalid access tokens and granting access to the physical access portal according to the comparison.

In Example 20, the subject matter of one or any combination of Examples 1-19 optionally includes initiating, by the verification application of the mobile device, a request for status to a verification device for the access credential information of a user of the mobile device, receiving a response to the request, and including the response to the request in the access credential information.

In Example 21, the subject matter of one or any combination of Examples 1-20 optionally includes tracking a history of user access of physical access portals; and displaying the notifications for the one or more detected physical access portals in an order determined by the history of user access.

Example 22 includes subject matter (such as a secure relay device of an access control system) or can optionally be combined with one or any combination of Examples 1-21 to include such subject matter, comprising physical layer circuitry and processing circuitry operatively coupled to the physical layer circuitry. The physical layer circuitry is configured to transmit a beacon signal that includes information identifying the physical access portal, and receive information wirelessly. The processing circuitry is configured to decode first authentication information received wirelessly from a mobile device, encode second authentication information for sending to the mobile device, decrypt access credential information received from the mobile device in response to sending the second authentication information, and grant access to a physical access portal according to the decrypted access credential information.

In Example 23, the subject matter of Example 22 optionally includes first processing circuitry configured to encode the information identifying the physical access portal and initiate sending the beacon signal, and second processing circuitry configured to decode the first authentication information.

Example 24 includes subject matter (or can optionally be combined with one or any combination of Examples 1-23 to include such subject matter) comprising a machine-readable storage medium including instructions that, when executed by processing circuitry of a mobile device, cause the mobile device to perform acts including detecting one or more physical access portals with controlled access, displaying notifications for the one or more physical access portals on a display screen of the mobile device, receiving a selection of a physical access portal using a user interface of the mobile device, establishing a secure communication channel with a secure relay device associated with the physical access portal, and sending an encrypted access token stored in the mobile device to the secure relay device.

In Example 25, the subject matter of Example 24 optionally includes a machine-readable storage medium including instructions that cause the mobile device to perform acts including displaying the notifications on the display screen after the user unlocks the mobile device for use.

In Example 26, the subject matter of Example 24 optionally includes a machine-readable storage medium including instructions that cause the mobile device to perform acts including displaying the notifications on the display screen while the mobile device is locked from use, and accepting the selection of the physical access portal while the mobile device is locked from use.

In Example 27, the subject matter of Example 26 optionally includes a machine-readable storage medium including instructions that cause the mobile device to perform acts including detecting contact to an icon on the locked display screen, wherein the icon is a notification of a physical access portal of the one or more physical access portals, and detecting holding of the contact to the icon for longer than a specified duration of time as the selection of the physical access portal.

In Example 28, the subject matter of one or any combination of Examples 24-27 optionally includes a machine-readable storage medium including instructions that cause the mobile device to perform acts including determining which of the one or more detected physical access portals the user can access based on information included in the access token, and only displaying notifications for the one or more detected physical access portals that the user can access to according to the information.

In Example 29, the subject matter of Example 28 optionally includes a machine-readable storage medium including instructions that cause the mobile device to perform acts including comparing identifiers of the detected physical access portals to a stored list of physical access portals allowed for access by a user of the mobile device, and displaying the notifications for the one or more detected physical access portals included in the list.

In Example 30, the subject matter of Example 29 optionally includes a machine-readable storage medium including instructions that cause the mobile device to perform acts including storing the list of physical access portals allowed for access by the user, wherein the list is user-defined.

In Example 31, the subject matter of Example 29 optionally includes a machine-readable storage medium including instructions that cause the mobile device to perform acts including storing the list of physical access portals allowed for access by the user, wherein the list is administrator-defined.

In Example 32, the subject matter of one or any combination of Examples 24-31 optionally includes a machine-readable storage medium including instructions that cause the mobile device to perform acts including determining distance of the one or more detected physical access portals to the mobile device, and displaying the notifications for the one or more detected physical access portals in an order determined by proximity to the mobile device.

In Example 33, the subject matter of Example 32 optionally includes a machine-readable storage medium including instructions that cause the mobile device to perform acts including determining the distance using received beacon signal strength.

In Example 34, the subject matter of Example 32 optionally includes a machine-readable storage medium including instructions that cause the mobile device to perform acts including determining the distance using a Bluetooth Low Energy Relative Signal Strength Indicator (BLE RSSI).

In Example 35, the subject matter of one or any combination of Examples 24-34 optionally includes a machine-readable storage medium including instructions that cause the mobile device to perform acts including determining, by the application, one or more of distance, position and movement of the mobile device relative to multiple detected physical access portals; and sorting and displaying the notifications for the multiple detected physical access portals according to the one or more of the determined distance, position and movement of the mobile device.

In Example 36, the subject matter of Example 35 optionally includes a machine-readable storage medium including instructions that cause the mobile device to perform acts including determining the one or more of distance, position and movement of the mobile device relative to multiple detected physical access portals using ultra-wide band (UWB) signaling.

In Example 37, the subject matter of Example 35 optionally includes a machine-readable storage medium including instructions that cause the mobile device to perform acts including determining the one or more of distance, position and movement of the mobile device relative to multiple detected physical access portals using one or more sensors included in the mobile device that determines the one or more of the distance, the position, and the movement of the mobile device relative to the multiple detected physical access portals.

In Example 38, the subject matter of one or any combination of Examples 24-37 optionally includes a machine-readable storage medium including instructions that cause the mobile device to perform acts including decoding information identifying a physical access portal received in a beacon signal.

In Example 39, the subject matter of one or any combination of Examples 24-38 optionally includes a machine-readable storage medium including instructions that cause the mobile device to perform acts including tracking a history of user access of physical access portals, and displaying the notifications for the one or more detected physical access portals in an order determined by the history of user access.

Example 40 includes subject matter (such as a method of operating an access control system) or can optionally be combined with one or any combination of Examples 1-39 to include such subject matter, comprising detecting one or more physical access portals using an application of a mobile device; establishing a secure communication channel with a secure relay device associated with the one or more detected physical access portals; displaying notifications for the one or more physical access portals on a display screen of the mobile device; receiving a selection of a physical access portal using a user interface of the mobile device; sending an encrypted access token stored in the mobile device to the secure relay device; granting access by the secure relay device to the selected physical access portal according to the encrypted access token.

In Example 41, the subject matter of Example 40 optionally includes determining, by the application, one or more of distance, position and movement of the mobile device relative to multiple detected physical access portals; and sorting and displaying the notifications for the multiple detected physical access portals according to the one or more of the determined distance, position and movement of the mobile device.

In Example 42, the subject matter of one or both of Examples 40 and 41 optionally includes comparing identifiers of the one or more detected physical access portals to a stored list of physical access portals; and displaying the notifications for the one or more detected physical access portals that a user of the mobile device is allowed to access based on the stored list.

These non-limiting Examples can be combined in any permutation or combination. The above detailed description includes references to the accompanying drawings, which form a part of the detailed description. The drawings show, by way of illustration, specific embodiments in which the invention can be practiced. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of operating an access control system, the method comprising:

generating, by a server of the access control system, an access token associated with both a mobile device of a user and including access credential information for the user;

receiving, by the mobile device, the access token and storing the access token in the mobile device, wherein the access token identifies the mobile device and identifies a secure relay device;

storing an access list in the mobile device identifying accessible secure relay devices accessible by the stored access token;

detecting multiple physical access portals using an application of the mobile device;

determining, by the application, which of the detected multiple physical access portals the user can access by comparing the access token stored in the mobile device and the access list previously stored in the mobile device;

displaying notifications of only the detected physical access portals that the application determined the user can access on a display screen of the mobile device and not displaying notifications of other detected physical access portals;

receiving a selection of a physical access portal using a user interface of the mobile device;

establishing a secure communication channel with a secure relay device associated with the selected physical access portal;

sending an encrypted access token of the access token stored in the mobile device that identifies the mobile device and the secure relay device to the secure relay device; and optionally granting access by the secure relay device to the selected physical access portal according to the encrypted access token.

2. The method of claim 1, wherein the displaying the notifications comprises:

displaying the notifications on the display screen while the mobile device is locked from use; and accepting the selection of the physical access portal while the mobile device is locked from use.

3. The method of claim 2, wherein the receiving the selection of a physical access portal comprises detecting contact to an icon displayed on the locked display screen corresponding to a physical access portal, and detecting holding of the contact to the icon for longer than a specified duration of time.

4. The method of claim 1, wherein the displaying the notifications comprises comparing identifiers of the detected multiple physical access portals to the stored access list of physical access portals allowed for access by a user of the mobile device, and displaying the notifications for the detected physical access portals included in the list.

5. The method of claim 1, wherein the displaying the notifications comprises:

determining, by the application, one or more of distance, position, or movement of the mobile device relative to the multiple detected physical access portals; and sorting and displaying the notifications for the multiple detected physical access portals according to the one or more of the determined distance, position, or movement of the mobile device.

6. The method of claim 5, wherein the determining the distance comprises determining the distance using received beacon signal strength.

7. The method of claim 5, wherein the determining the one or more of distance, position, or movement of the mobile device comprises determining the one or more of distance, position, or movement of the mobile device relative to the multiple detected physical access portals using ultra-wide band (UWB) signaling.

8. The method of claim 5, wherein the one or more of distance, position, or movement of the mobile device relative to the multiple detected physical access portals is determined using one or more sensors included in the mobile device that determines the one or more of the distance, position, or movement of the mobile device relative to the multiple detected physical access portals.

9. The method of claim 1, wherein the displaying the notifications comprises:

comparing the multiple detected physical access portals to at least one of a user-defined list of physical access portals stored in memory of the mobile device or an administrator-defined list of physical access portals; and displaying or not displaying notifications for certain ones of the multiple detected physical access portals based on the at least one of the user-defined list or the administrator-defined list.

10. The method of claim 1, wherein the detecting the multiple physical access portals comprises detecting a beacon signal from a secure relay device associated with at least one physical access portal of the multiple physical access portals using the application of a mobile device.

11. The method of claim 1, comprising:

tracking a history of user access of physical access portals; and displaying the notifications for the multiple detected physical access portals in an order determined by the history of user access.

12. The method of claim 1, including:

receiving, by the mobile device, an updated revocation list from the server;

sending, by the mobile device, the updated revocation list to the secure relay device; and wherein the optionally granting access by the secure relay device includes the secure relay device optionally granting the access according to the updated revocation list.

13. A non-transitory computer readable recording medium comprising instructions of an application that, when executed by processing circuitry of a mobile device, cause the mobile device to perform acts comprising:

receiving an access token from a server of an access control system and storing the access token in the mobile device, wherein the access token identifies the mobile device and identifies a secure relay device and includes access credential information;

storing an access list in the mobile device identifying accessible secure relay devices accessible by the stored access token;

detecting multiple physical access portals;

determining, by the application, which of the multiple detected physical access portals the user can access by comparing the stored access token stored in the mobile device and the access list previously stored in the mobile device;

displaying notifications of only the detected physical access portals that the application determined the user can access on a display screen of the mobile device and not displaying notifications of other detected physical access portals;

receiving a selection of a physical access portal using a user interface of the mobile device;

establishing a secure communication channel with a secure relay device associated with the physical access portal; and sending an encrypted access token of the access token stored in the mobile device that identifies the mobile device and the physical access portal to the secure relay device.

14. The non-transitory computer readable recording medium of claim 13, comprising instructions that cause the mobile device to perform acts comprising:

displaying the notifications on the display screen while the mobile device is locked from use; and accepting the selection of the physical access portal while the mobile device is locked from use.

15. The non-transitory computer readable recording medium of claim 14, comprising instructions that cause the mobile device to perform acts comprising:

detecting contact to an icon on the locked display screen, wherein the icon is a notification of a physical access portal of the one or more physical access portals; and detecting holding of the contact to the icon for longer than a specified duration of time as the selection of the physical access portal.

16. The non-transitory computer readable recording medium of claim 13, comprising instructions that cause the mobile device to perform acts comprising:

determining, by the application, one or more of distance, position, or movement of the mobile device relative to the multiple detected physical access portals; and sorting and displaying the notifications for the multiple detected physical access portals according to the one or more of the determined distance, position, or movement of the mobile device.

17. The non-transitory computer readable recording medium of claim 16, comprising instructions that cause the mobile device to perform acts comprising determining the distance using received beacon signal strength.

18. The non-transitory computer readable recording medium of claim 16, comprising instructions that cause the mobile device to perform acts comprising determining the one or more of distance, position, or movement of the mobile device relative to the multiple detected physical access portals using ultra-wide band (UWB) signaling.

19. The non-transitory computer readable recording medium of claim 16, comprising instructions that cause the mobile device to perform acts comprising determining the one or more of distance, position, or movement of the mobile device relative to the multiple detected physical access portals using one or more sensors included in the mobile device that determines the one or more of the distance, position, or movement of the mobile device relative to the multiple detected physical access portals.

20. The non-transitory computer readable recording medium of claim 13, comprising instructions that cause the mobile device to perform acts comprising:

tracking a history of user access of physical access portals; and displaying the notifications for the multiple detected physical access portals in an order determined by the history of user access.

21. The non-transitory computer readable recording medium of claim 13, comprising instructions that cause the mobile device to perform acts comprising:

receiving an updated revocation list from the server; and sending the updated revocation list to the secure relay device while the mobile device is offline from the server.

* * * * *